United States Patent [19]

Mullenberg

[11] Patent Number: 5,476,337
[45] Date of Patent: Dec. 19, 1995

[54] CONICAL GRIPPING ARRANGEMENT

[76] Inventor: Ralph Mullenberg, Im Wiesengrund 6, D41516 Grevenbroich, Germany

[21] Appl. No.: 203,794

[22] Filed: Mar. 1, 1994

[30] Foreign Application Priority Data

Mar. 5, 1993 [DE] Germany .......................... 43 07 043.4

[51] Int. Cl.$^6$ ...................................... F16D 1/09
[52] U.S. Cl. .......................... 403/370; 403/368; 403/367
[58] Field of Search ...................................... 403/371, 370, 403/369, 368, 367

[56] References Cited

U.S. PATENT DOCUMENTS

| 1,771,679 | 7/1930 | Brunner ................................. 403/370 |
| 3,210,104 | 10/1965 | Davis et al. . |
| 3,501,182 | 3/1970 | Buchsbaum ........................ 403/371 X |
| 4,471,846 | 9/1984 | Mullenberg ........................ 403/370 X |
| 4,702,635 | 10/1987 | Muellenberg ...................... 403/368 X |

FOREIGN PATENT DOCUMENTS

| 1361776 | 4/1964 | France . |
| 1431275 | 1/1966 | France .................................... 403/370 |
| 1190266 | 11/1965 | Germany . |
| 3305538 | 10/1984 | Germany . |
| 3833350 | 4/1990 | Germany .............................. 403/368 |
| 4129490 | 3/1993 | Germany . |

Primary Examiner—Anthony Knight
Attorney, Agent, or Firm—Vickers, Daniels & Young

[57] ABSTRACT

The conical gripping arrangement (100) serves for attaching a construction component (4) with a hub (10) onto a shaft (1). The hub (10) possesses a conical external peripheral surface (16) on which a graduated conical ring (13) with a conical internal peripheral surface (17) is arranged. The other conical internal peripheral surface (21) rests against the conical external peripheral surface (23) of the conical section (7) of a conical casing (20) which engages with a cylindrical casing section (6) resting on the shaft (11) in a cut away section (11) of the hub (10) and is clamped there together with the hub (10) (FIG. 1).

19 Claims, 1 Drawing Sheet

CONICAL GRIPPING ARRANGEMENT

BACKGROUND OF THE INVENTION

The invention relates to a conical gripping arrangement for fixing a hub onto a shaft.

Such a conical gripping device is known from FR 13 61 776 and U.S. Pat. No. 3,210,104. However, in order for larger torques to be transferred to a shaft, it is known that a certain length of the hub is required in order to avoid excessive surface pressures. This length is not available in many cases for design and constructional reasons.

The expression 'hub', as expressed herein, ought not to be understood to mean only an actual hub, i.e. a cylindrical axial projection on a construction component. It is also intended to include the connecting sheath of a shaft coupling and/or casing-like cylindrical construction components which surround a shaft and which will be connected to a conical gripping device.

SUMMARY OF THE INVENTION

In accordance with the present invention, the torque which is capable of being transferred to a limited hub length is increased by the conical gripping arrangement of the present invention.

In accordance with one aspect of the present invention a conical gripping arrangement for fixing a hub onto a shaft is provided. The external peripheral surface of the hub is designed in the form of a conical surface. A conical ring having a conical internal peripheral surface is provided. The conical internal peripheral surface has generally the same conical angle as the external peripheral surface of the hub. Axial tension screws of the hub tighten and draw the conical ring uniformly together with the hub, whereby the conical internal peripheral surface is located together with the conical external peripheral surface. Thus, the hub is compressed radially and is clamped together with the shaft.

The conical ring is connected at one end which has the smaller diameter of the conical internal peripheral surface to a conical ring component. The conical ring component is located axially beyond the end of the conical ring, whereby the conical ring component has a conical internal peripheral surface of the same conical angle as the conical ring, and is sloped in the same direction as the conical internal peripheral surface of the conical ring. The hub has a cylindrical cut away section which is coaxial to the shaft on the internal peripheral surface turned toward the shaft.

A conical casing is provided which rests on the external peripheral surface of the shaft. The conical casing has a conical section with a conical external peripheral surface which works in conjunction with the conical internal peripheral surface of the conical ring component and is connected, in a manner which is resistant to rotation, to a casing section which is, in turn, connected axially and fits into the cut away section. On compressing the hub, the casing section is also capable of being compressed and is capable of being clamped firmly onto the shaft.

The diameters of the pairs of conical surfaces of the conical ring and/or of the conical ring component are co-optimized with respect to one another in such a way, i.e. effectively work or cooperate together, that on tightening the tension screws radial clamping forces are capable of being exerted in the region of the conical ring and, in addition, in the region of the conical ring component.

The casing-like component of the invention grips the hub and is clamped at the same time by the conical ring which is arranged on the hub. As a result of its connection to the conical ring component in a manner which is resistant to rotation, the casing-like component transfers the torque into the area of the conical casing section which is clamped onto the shaft by the conical ring component of the graduated ring and cooperates in the transfer of torque.

Cylindrical parts of a conical ring element which work in conjunction with other conical ring elements of a conical gripping arrangement are known independently from the non-published patent application P 41 29 490.4–12. However, the function of the cylindrical casing component therein does not transfer the torque to axially adjacent components.

The connection of the invention, which is resistant to rotation between the casing section and the conical section, is provided in a preferred embodiment of the invention by the feature that both sections are made from one piece of material. In other words, the conical ring and the conical ring component are made in one piece and the casing section is made in one piece with the conical section.

In order to minimize loss of the gripping force of the axial tension screws by pure deformation forces in overcoming the play in the region of the hub, it is preferred that the casing section be subdivided longitudinally at least one location on its periphery in a plane which passes through the shaft axis.

In a preferred embodiment of the invention, the conical ring and the conical ring component form a graduated conical ring. In an alternative embodiment, the conical ring and conical ring component form a smooth ring such that adjacent internal peripheral surfaces merge in an aligned manner.

An external graduated conical ring is known independently from DE 11 90 266 C. In the case of the known form of embodiment, the external graduated conical ring nevertheless works in conjunction with an internal graduated conical ring made from one piece of material whereas in the case of the present invention three components are present and another function is provided.

An important configuration of the invention comprises the feature that a lubricating system is provided on the conical surfaces which work together, as is known independently from DE 33 05 538 Cl or U.S. Pat. No. 3,210,104.

Axial tension screws, when tightened, ensure that both the conical ring and the conical ring component are brought into a braced situation in such a way that clamping of the hub is achieved.

BRIEF DESCRIPTION OF THE DRAWINGS

Examples of embodiments of the invention are shown in the drawings which form a part hereof and wherein.

PREFERRED EMBODIMENTS

Figure 1:
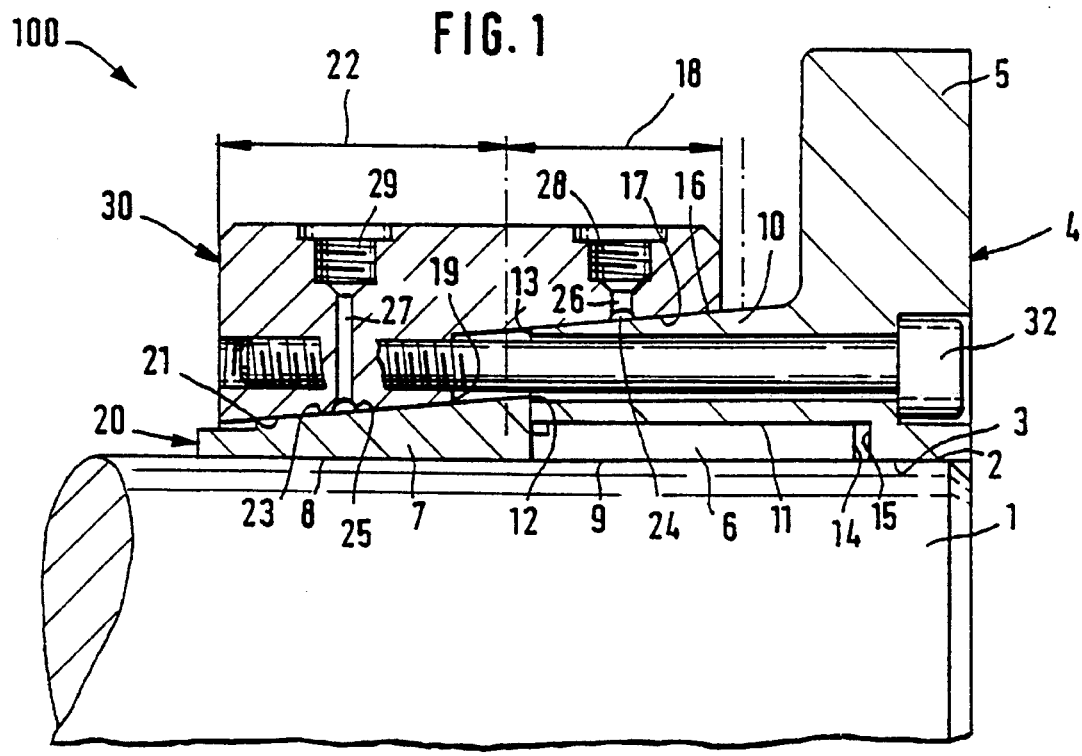
FIG. 1 shows a first example of an embodiment of the configuration of a hub fixture in which the conical gripping arrangement is illustrated in a section which passes through the shaft axis.

In the case of the conical gripping arrangement 100 of FIG. 1, a shaft 1 is provided with a cylindrical external periphery 2 on which an external construction component 4 has been positioned that is arranged in a centralized manner together with a cylindrical internal periphery on a part of its axial extension on the external circumference 2. The external construction component 4 comprises, for example, a flange 5 or a gear wheel or some other functional component of this type and a hub 10 extending axially from it which surrounds the shaft 1. In the vicinity of the hub 10, a cylindrical cut-away section 11, which is coaxial with respect to the shaft axis and open with respect to the shaft 1, is provided on its internal periphery 3 and which retains a hollow cylindrical intermediate space between the internal circumference 12 of the hub 10 and the external circumference 2 of the shaft 1, into which a hollow cylindrical casing section 6 of a conical casing 20 just passes. The casing section 6 is located with its internal peripheral surface 9 at the external peripheral surface 2 of the shaft 1 and is longitudinally slotted at least one site on its circumference in a plane which passes through the axis of the shaft 1 so that the casing section 6 is easily deformable in a radial manner.

The casing section 6 is made in one piece with a conical section 7 and has a cylindrical internal peripheral surface 8 which is aligned with the internal peripheral surface 9 of the casing section 6 and is located communally with this on the external circumference 2 of the shaft 1. At the end of the conical section 8, the conical casing 20 has a step 12 which projects radially outward over the casing section 6 which, in the case of insertion of the conical casing 20 toward the right in accordance with FIG. 1, is capable of being brought into position at the front side 13 of the hub 10. Alternatively, the front side right end 14 of the casing component 6 could also come into position at the end 15, which is located there, of the cut away section 11.

The conical external peripheral surface 16 of the hub 10 has a self-restraining conical angle and works in conjunction with the conical internal peripheral surface 17 of a conical ring 18 which is made in one piece with a conical ring component 22 which extends radially inward in front of the front side 13 of the hub 10 in a step 19 and has a conical internal peripheral surface 21 which works in conjunction with the conical external peripheral surface 23 of the conical section 7. The conical angle of the conical surfaces 21, 23 is the same as that of the conical surfaces 16, 17. Together, the conical ring 18 and the conical ring component 22 thus form a graduated conical ring 30.

In order to facilitate sliding of the conical surfaces 16, 17 or, as the case may be, 21, 23 over one another, a system of groovelike channels can be provided in each of the cooperating conical surfaces from which, in each case, a channel 24, 25 runs in the peripheral direction as indicated in FIG. 1.

The peripheral channels 24, 25 are connected via supply lines 26, 27 to connections 28, 29 through which a liquid lubricant can be applied under very high pressure which spreads out in an axial direction from the channels 24, 25 over the sliding surfaces 16, 17 and/or surfaces 21, 23 and facilitates the sliding of these in the axial direction.

On axially tightening by means of the tension screws 32 which engage from the front side 13 of the hub 10 with the part 19 of the conical ring component 22 which projects radially towards the inside, the graduated conical ring 30 is drawn against the construction component 4. In this way, the conical ring 18 comes into position first of all on the conical surface 16 of the hub 10 and begins to exert radial forces there, which, in the case of further increasing the tension force of the tension screws 32 presses together the hub 10 and the casing like component 6 which is located underneath, on the shaft 1. Before full tension is achieved, the conical surfaces 21, 23 also come into position on one another and the conical section 7 of the conical casing 20 is pressed firmly onto the shaft 1. In the example of an embodiment, the casing section 6 is made in one piece with the conical section 7 so that the torque is transferred into the conical section 8 located as such beyond the hub 10 via the casing section 6 into the area of the component 4 and the total transferable torque is increased in addition to the part of the torque which is transferable itself in the region of the hub 10.

Figure 2:
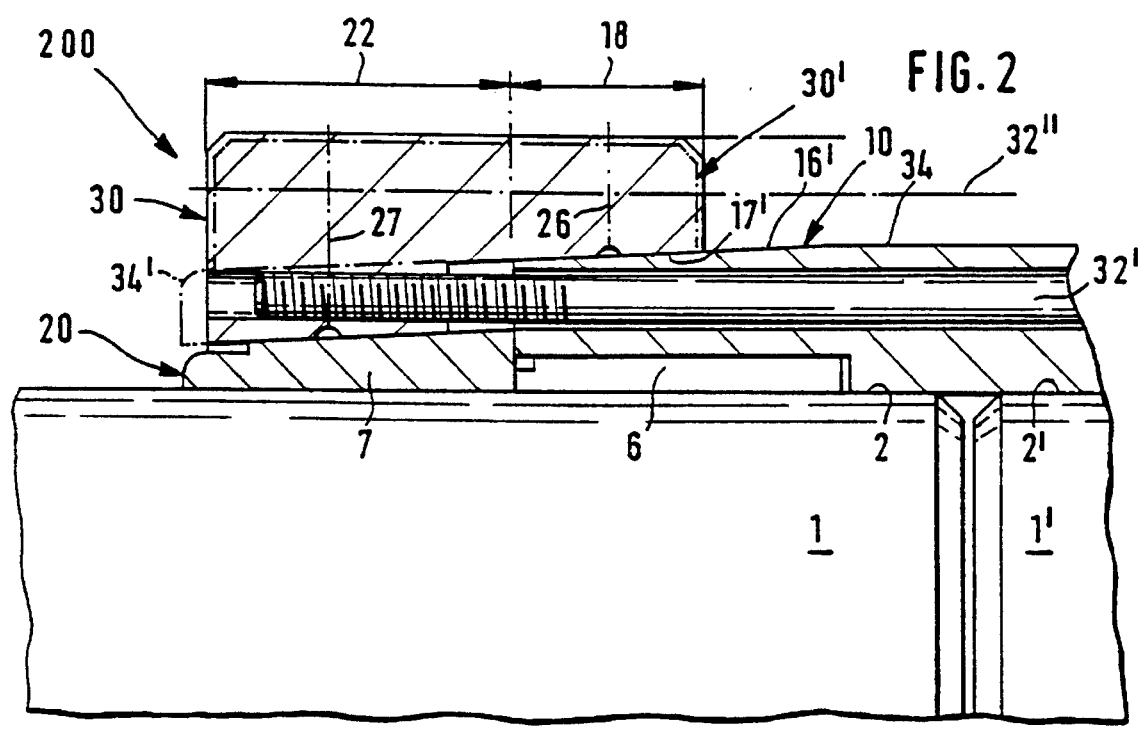
FIG. 2 shows a corresponding view in which the hub part is a shaft coupling.

In the conical gripping arrangement 200 of FIG. 2, the reference numbers are the same provided that functionally corresponding parts are present. The main difference comprises the feature that we are not concerned with attaching a construction component 4 to a shaft 1 but with connecting two shaft ends 1, 1', which have the same diameters in the example of an embodiment, by means of a connecting casing 34 which is arranged with its internal hole on the external periphery 2, 2' of the shaft ends 1, 1' and has "hubs" 10 at its axial ends which are designed in the same way and work in the same way in conjunction with the conical casing 20 as in the form of embodiment 100. Merely the same arrangement is still present on the shaft end 1' on the right outside of FIG. 2. The axial tension screws 32' pass through the entire length of the conical gripping arrangement 200 and connect the two graduated conical rings 30 to one another.

As an alternative, it is indicated in FIG. 2 that one does not have to have a graduated conical casing 30; the hub 10 can also be extended under the external conical ring part 22 as is indicated in 34' by dots and dashes. The conical ring 18 and the conical ring component 22 hereby form a non-slotted ring 30' with a uniform conical internal peripheral surface 17' passing through. The axial tension screws would then run radially outside of the connecting casing 34 at the level of the partial zone 32".

In order to avoid excessively large losses in force for the radial pressing together of the conical section 7, this can also be slotted in a longitudinal manner here whereby, in the region of the external conical surface 16', a path must remain in existence in order that a closed surface remain in existence for the lubricating agent which is supplied under high pressure to this location via the feed lines 26, 27.

Having thus described the invention, it is claimed:

1. Conical gripping arrangement for fixing a hub onto a shaft having an axis, said hub including an external peripheral surface and an axis, the external peripheral surface of said hub designed in the form of a conical surface having a conical angle, said conical surface being coaxial to said hub axis, a conical ring having a conical internal peripheral surface and having a conical angle generally the same as said conical angle of said conical surface and which is arranged together with said internal peripheral surface on said external peripheral surface of said hub, axial tension screws which are distributed uniformly over the circumference of said hub by means of which said conical ring is located together with said conical internal peripheral surface on said conical external peripheral surface of said hub whereby said conical ring is capable of being tightened and whereby said hub is compressed radially and is clamped together with said shaft, said arrangement comprising said conical ring having first and second ends, said first end having a smaller diameter of said conical internal peripheral surface, said conical ring connected at said first end to a conical ring component, said conical ring component being non-subdivided about its circumference and located axially beyond said first end, whereby said conical ring component has a conical internal peripheral surface of generally the same conical angle as said conical surface of said hub and is coaxial to said conical ring, said hub having an internal peripheral surface which is turned towards the shaft, and a cylindrical cut away section which is coaxial to said shaft, a conical casing is further provided and located on the external peripheral surface of said shaft, said conical casing having a conical section with a conical external peripheral surface for working with said conical internal peripheral surface of said conical ring component and is connected to a casing section, said casing section connected axially to said conical section, said casing section fits into said cut away section whereby said casing section is capable of being compressed and is capable of being clamped firmly onto the shaft when said hub is compressed, said conical internal peripheral surface of said conical ring and said conical external peripheral surface of said hub forming a first pair adjacent conical surfaces, said conical internal peripheral surface of said conical ring component and said conical external peripheral surface of said conical casing forming a second pair of adjacent conical surfaces, each of said adjacent conical surfaces forming said first and second pairs of conical surface are co-optimized in such a way that on tightening said tension screws radial clamping forces are capable of being exerted in the region of said conical ring and in the region of said conical ring component.

2. Conical gripping arrangement of claim 1, wherein said conical ring is made in one piece with said conical ring component and said casing section is made in one piece with said conical section.

3. Conical gripping arrangement of claim 1, wherein, at at least one peripheral location, said casing section is subdivided longitudinally in a plane which passes generally perpendicular through said shaft axis.

4. Conical gripping arrangement of claim 1, wherein said conical ring component extends radially inward from said conical internal peripheral surface to a step adjacent a front-side end of said hub, said step extends between said conical external peripheral surface and said conical internal peripheral surface, said conical external peripheral surface located radially inward of said conical section so that said conical ring and said conical ring component from a graduated conical ring.

5. Conical gripping arrangement of claim 1, wherein said internal peripheral surfaces of said conical ring and of said conical ring component and said external peripheral surfaces of said hub and of said conical section merge into one another in an aligned manner.

6. Conical gripping arrangement of claim 1, wherein a channel system is provided on at least one pair of said conical surfaces for providing a lubricant which is distributed over said pair of conical surfaces, said lubricant capable of being introduced under very high pressure through at least one feed line.

7. Conical gripping arrangement of claim 1, wherein said diameters of each said pairs of conical surfaces of said conical ring and of the hub or, of said conical ring component and of said conical section are co-optimized to the adjacent conical surface in such a way that when said tension screws are tightened, said conical ring initially becomes free from play in a radial sense and exerts clamping forces and said conical ring component also becomes free from play and exerts radial forces before a maximum axial displacement and clamping of said conical ring are achieved.

8. Conical gripping arrangement of claim 2, wherein at at least one peripheral location, said casing section is subdivided longitudinally in a plane which passes generally perpendicular through said shaft axis.

9. Conical gripping arrangement of claim 2, wherein said conical ring component extends radially inwardly from said conical internal peripheral surface to a step adjacent a front-side end of said hub, said step extends between said conical external peripheral surface and said conical internal peripheral surface, said conical external peripheral surface located radially inwardly of said conical section so that said conical ring and said conical ring component form a graduated conical ring.

10. Conical gripping arrangement of claim 3, wherein said conical ring component extends radially inwardly from said conical internal peripheral surface to a step adjacent a front-side end of said hub, said step extends between said conical external peripheral surface and said conical internal peripheral surface, said conical external peripheral surface located radially inwardly of said conical section so that said conical ring and said conical ring component form a graduated conical ring.

11. Conical gripping arrangement of claim 2, wherein said internal peripheral surfaces of said conical ring and of said conical ring component and said external peripheral surfaces of said hub and of said conical section merge into one another in an aligned manner.

12. Conical gripping arrangement of claim 3, wherein said internal peripheral surfaces of said conical ring and of said conical ring component and said external peripheral surfaces of said hub and of said conical section merge into one another in an aligned manner.

13. Conical gripping arrangement of claim 2, wherein a channel system is provided on at least one pair of said conical surfaces for providing a lubricant which is distributed over said pair of conical surfaces, said lubricant capable of being introduced under very high pressure through at least one feed line.

14. Conical gripping arrangement of claim 3, wherein a channel system is provided on at least one pair of said conical surfaces for providing a lubricant which is distributed over said pair of conical surfaces, said lubricant capable of being introduced under very high pressure through at least one feed line.

15. Conical gripping arrangement of claim 4, wherein a channel system is provided on at least one pair of said conical surfaces for providing a lubricant which is distributed over said pair of conical surfaces, said lubricant capable of being introduced under very high pressure through at least one feed line.

16. Conical gripping arrangement of claim 2, wherein said diameters of each said pair of conical surfaces of said conical ring and of the hub or, of said conical ring component and of said conical section are co-optimized to the adjacent conical surface in such a way that when said tension screws are tightened, said conical ring initially becomes free from play in a radial sense and exerts clamping forces and said conical ring component also becomes free from play and exerts radial forces before a maximum axial displacement and clamping of said conical ring are achieved.

17. Conical gripping arrangement of claim 3, wherein said diameters of each said pair of conical surfaces of said conical ring and the of hub or, of said conical ring component and of said conical section are co-optimized to the adjacent conical surface in such a way that when said tension screws are tightened, said conical ring initially becomes free from play in a radial sense and exerts clamping forces and said conical ring component also becomes free from play and exerts radial forces before a maximum axial displacement and clamping of said conical ring are achieved.

18. Conical gripping arrangement of claim 4, wherein said diameters of each said pair of conical surfaces of said conical ring and of the hub or, of said conical ring component and of said conical section are co-optimized to the adjacent conical surface in such a way that when said tension screws are tightened, said conical ring initially becomes free from play in a radial sense and exerts clamping forces and said conical ring component also becomes free from play and exerts radial forces before a maximum axial displacement and clamping of said conical ring are achieved.

19. Conical gripping arrangement of claim 5, wherein said diameters of each said pair of conical surfaces of said conical ring and of the hub or, of said conical ring component and of said conical section are co-optimized to the adjacent conical surface in such a way that when said tension screws are tightened, said conical ring initially becomes free from play in a radial sense and exerts clamping forces and said conical ring component also becomes free from play and exerts radial forces before a maximum axial displacement and clamping of said conical ring are achieved.

* * * * *